United States Patent
Nori et al.

[11] Patent Number: 6,061,690
[45] Date of Patent: May 9, 2000

[54] APPARATUS AND METHOD FOR STORAGE OF OBJECT COLLECTIONS IN A DATABASE SYSTEM

[75] Inventors: Anil Nori, San Jose; Viswanathan Krishnaomurthy, Fremont; Vikas Arora, Mountain View; Srinath Krishnaswamy, Redwood City, all of Calif.

[73] Assignee: Oracle Corporation, Redwood Shores, Calif.

[21] Appl. No.: 08/962,535

[22] Filed: Oct. 31, 1997

[51] Int. Cl.[7] .................................................. G06F 17/30
[52] U.S. Cl. .................. 707/103; 707/2; 707/3; 707/4; 707/5; 707/100; 707/205
[58] Field of Search ................... 707/103, 205, 707/2, 5, 4, 100, 105, 3

[56] References Cited

U.S. PATENT DOCUMENTS

| | | | |
|---|---|---|---|
| 5,291,583 | 3/1994 | Bapat | 395/705 |
| 5,307,484 | 4/1994 | Baker et al. | 707/102 |
| 5,499,359 | 3/1996 | Vijaykumar | 707/4 |
| 5,546,577 | 8/1996 | Marlin et al. | 707/103 |
| 5,560,005 | 9/1996 | Hoover et al. | 707/102 |
| 5,566,329 | 10/1996 | Gainer et al. | 707/4 |
| 5,615,367 | 3/1997 | Bennett et al. | 707/102 |
| 5,652,882 | 7/1997 | Doktor | 707/201 |
| 5,675,779 | 10/1997 | Doktor | 707/4 |
| 5,692,445 | 12/1997 | Winer | 108/100 |
| 5,732,402 | 3/1998 | Lehman | 707/205 |
| 5,742,810 | 4/1998 | Ng et al. | 707/4 |
| 5,778,356 | 7/1998 | Heiny | 707/2 |
| 5,794,229 | 9/1998 | French et al. | 707/2 |
| 5,799,310 | 8/1998 | Anderson et al. | 707/102 |
| 5,875,446 | 2/1999 | Brown et al. | 707/3 |
| 5,890,160 | 3/1999 | Hembry | 707/103 |
| 5,920,860 | 7/1999 | Maheshwari et al. | 707/5 |

*Primary Examiner*—Paul R. Lintz
*Assistant Examiner*—Jean M. Corrielus
*Attorney, Agent, or Firm*—McDermott, Will & Emery

[57] ABSTRACT

The present invention pertains to an apparatus and process for storing information object collections in a database. Examples of such object collections are nested tables and variable length arrays. In an embodiment, the invention provides mechanisms and methods for storing nested tables in either a base table of a database, or an index-organized table. In one embodiment, mechanisms and methods are provided for storing variable length arrays into a table column, as a large object ("LOB"), or as an index-organized table. The invention also provides methods and mechanisms for accessing data from these storage mediums.

25 Claims, 5 Drawing Sheets

APPARATUS AND METHOD FOR STORAGE OF OBJECT COLLECTIONS IN A DATABASE SYSTEM

FIELD OF THE INVENTION

This invention generally relates to data processing, and relates more specifically to methods of storing collections of information as part of objects that are managed using a database system.

BACKGROUND OF THE INVENTION

Database systems are computer programs optimized for creating, storing, manipulating, and reporting on information stored in tables. Each table is organized as an array of rows and columns. The values in the columns of a given row are typically associated with each other in some way. For example, a row may store a complete data record relating to a sales transaction, a person, or a project. Columns of the table define discrete portions of the rows that have the same general data format. For example, columns define fields of the records.

Many computer programming languages permit information to be defined by an object type, "class," or "abstract data type" (ADT). ADTs provide a way to classify information. In computer programs written using a language that supports ADTs, every constant, variable, expression, function, or combination has a certain type. Thus, an ADT is an abstract representation of data that serves as a template for an information object. An ADT is made into an explicit representation of the type using a declaration of the constant, variable, or function. The thing that is declared is called an information object or simply an object. In object-oriented programming languages such as C++ and Java, the term "class" refers to the ADT of an object. Objects may store a combination of data and methods for acting on the data. An "instance" of an object matching a class is "instantiated" or created when the program is run, based upon the class definition of the object.

A detailed discussion of ADTs and data structures is provided in N. Wirth, "Algorithms+Data Structures= Programs" (Englewood Cliffs, N.J.: Prentice-Hall, 1976), and D. Knuth, "The Art of Computer Programming" (Reading, Mass., Addison-Wesley Pub. Co., 2d. ed. 1973), ch. 2, "Information Structures". In the context of this document, the term "ADT" refers broadly to a type definition or object class for an information object and is intended to include the meaning of the term "class" as that term is used in object-oriented programming environments.

ADTs may be complex. An ADT may comprise a combination of one or more scalar data types such as integers, arrays and other numeric types, characters or strings, pointers, other ADTs, database tables, or large arrays. Each component of an ADT is called an attribute. However, database systems are known to operate fastest and with greatest efficiency when simple data types are stored in the database tables. Accordingly, storing objects defined by complex ADTs in a database table presents a difficult problem. A number of effective approaches to this problem are disclosed in co-pending U.S. patent application Ser. No. 08/962,409, "Object Representation and Storage in a Database System," attorney docket number 3018-093 (OID 1997-10-02), which is hereby incorporated by reference as if fully set forth herein.

A related problem is communicating complex information objects in a complex, distributed system or network that interconnects different types of computers and program processes. Data are not universally transportable from one computer to any other computer. Different computers, operating systems, programming languages, and application software often use different native forms or formats for representing data. For example, several different formats can be used to represent numbers in a computer memory. Some processors represent a numeric value in memory as a string of bits in which the least significant bit is at the lowest memory location. Other processors represent values with the most significant bit at the lowest memory location. One type of processor cannot directly access and use values stored in a memory that were created by the other type of processor. This is known as a format representation problem. Examples of such incompatible processors are the SPARC and VAX processors.

Incompatibilities also exist among different programming languages that are usable on the same platform. For example, such modern programming languages as C and Pascal enable a programmer to express a set of information in a complex abstract data type such as a record or structure, but there is no universal protocol for representing such abstract data types in a computer memory. This incompatibility increases the complexity of computer systems and makes data interchange difficult and inefficient. Further, different processors may represent a data type of a programming language in different ways. One processor may represent a floating-point number in four bytes while another processor may represent it in eight bytes. Thus, data created in memory by the same program running on different processors is not necessarily interchangeable. This is known as a layout representation incompatibility.

Alignment representation presents yet another problem in data interchange. With some processors, particular values or data types must be aligned at a particular memory location. When data is interchanged, there is no assurance that the inbound information uses the alignment required by the computer receiving the information. Still another problem is inheritance representation. Certain object-oriented programming languages, such as C++, support the concept of inheritance, whereby an abstract data type may inherit properties of a previously defined abstract data type. Languages that support inheritance provide extra pointer fields in memory representations of abstract data types or classes that use base classes and functions defined at runtime. The value of an inheritance pointer is not known until runtime, and is not persistent. Therefore, transmission from one system to another of an instance of an abstract data type that inherits properties from another abstract data type is not generally practical.

Character representation is another problem. Computers used in different nations of the world also may use incompatible character sets. Data formatted in one character set cannot be directly used or interpreted by a system that uses a different character set.

In a networked computer environment, these problems are more acute. A network may comprise several different types of computers, platforms, or application programs. A programmer writing software for use in a widely distributed network has no assurance that a destination or target computer can understand information sent from a source machine. Moreover, many network communication protocols are best suited to the transmission of simple, linear strings of values or characters. Complex abstract data types, especially those with pointers, generally cannot be transmitted reliably over such a network in the same form used to represent the data types in memory. Also, when a pointer points to a large or complex collection of data values, such as a table of a database system, it may be impractical or inefficient to convert the entire table to a universal form for transmission over the network.

Approaches to solving these problems are presented in the above-referenced copending U.S. Patent Application, and in co-pending U.S. patent application Ser. No. 08/961,795, entitled "Apparatus and Method for Pickling Data," attorney docket number 3018-092 (OID 1997-10-01).

Still another problem encountered in these systems is the storage and internal representation of information objects that are defined by ADTs that have collection attributes. In this context, "collection attribute" refers to a non-scalar attribute comprising a related set of scalar attributes, arranged in one or two dimensions. For example, collection attributes include nested database tables and varying length arrays.

Yet another problem of these systems is the storage and representation in columns of tables managed by database systems, including relational databases and object-relational database systems, of information objects that are collections. For example, present database systems do not provide a mechanism by which information collections, such as a database table or a varying length array, can be stored in a column of a database table.

Present systems do not provide a convenient, efficient way to store information objects defined by an ADT in which attributes are collections. In one approach, when an application needs to have a collection associated with an information object, generally the collection has to be stored apart from the information object, e.g., in a separate object. In this approach, the system also must provide a mechanism to relate the original information object to the collection object. This is awkward and imposes overhead. Having methods for storing collections as attributes of an ADT is highly desirable, because it provides programmers and application developers with greater freedom in defining and manipulating information structures.

In another approach, the contents of a collection are stored in a database column associated with an information object. For example, in a method of storage in which each attribute of the ADT of an information object is stored in a separate column of a database table, each collection attribute also is stored in a separate column. However, in most database systems approach this is impractical because the systems impose a limit on the size of an element in a column. For example, in one known database system each element in a column must be no larger than 4096 bytes. This is too little to accommodate a large nested table or large varying length array.

Thus, there is a need for ways to store information collections integral with information objects.

There is also a need for a mechanism that permits information collections to be stored in association with information objects as an attribute of the objects.

There is a need for a mechanism providing for storage of information objects that have collection attributes in database tables.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In one aspect, the invention provides a method of storing an information object in a database system, comprising the steps of establishing a collection attribute in the information object; establishing a first table of attributes of the information object in the database system; establishing a collection storage structure for the collection attribute in the database system; storing a reference to the collection storage structure in a column of the first table; and storing values of the collection attribute in the collection storage structure. One feature of this aspect of the invention is establishing a second table in the database system; and storing first and second identifiers of the first table and the collection storage structure in respective columns of the second table. Another feature involves establishing the collection storage structure in the form of a storage table in the database system; establishing in the storage table, at least one nested table portion comprising rows of values of the collection attribute associated with the reference; and storing a copy of the reference in a base table identifier column of the storage table.

Another feature is that the step of establishing a collection attribute in the database system comprises the step of establishing a variable length array as the collection attribute of the information object. A related feature is that when the variable length array is defined having fixed-length elements: computing a maximum size value representing an amount of storage space required for an instance of the variable length array; and storing the variable length array in a database column when the maximum size value is equal to or less than a pre-defined maximum database column size value. Another related feature is that the step of storing the variable length array in a large object structure when the maximum size value is greater than the maximum database column size value. Still another related feature involves, when the variable length array is defined having variable-length elements, storing the variable length array in an index-organized table.

Another related feature involves storing, in a node of the index-organized table, an identifier of the variable length array, an element order value indicating an ordinal position within the variable length array of an element of the variable length array, and a value of the element.

According to another feature, the method also has the steps of establishing the collection storage structure as an index organized table; and storing, in a leaf node of the index organized table, a value of the collection attribute. Yet another feature includes the further steps of retrieving the information object by carrying out the steps of, when the information object has at least one collection attribute: retrieving the reference to the collection storage structure; and retrieving a value of an element of the collection attribute and delivering the value to an external process only when the element is accessed by the external process.

A related feature includes the steps of retrieving the information object and all values of each attribute thereof when the information object has no collection attribute.

In other aspects, the invention encompasses an apparatus, computer program product, and computer data signal embodied in a carrier wave that are configured to carry out the foregoing steps.

DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Figure 1:
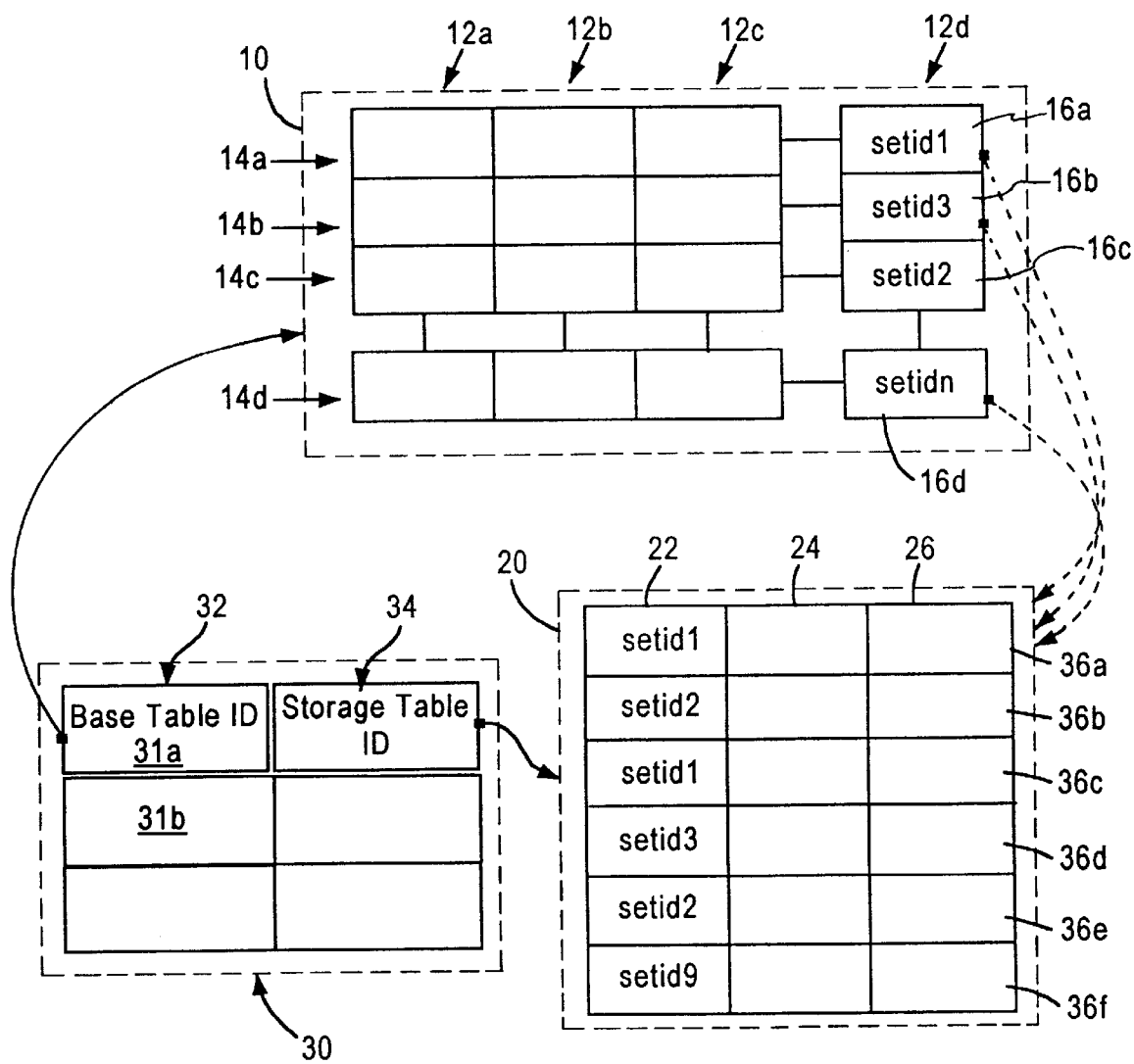
FIG. 1 is a block diagram of a first mechanism for storing nested tables.

Mechanisms for storage and use of complex information objects that include collection attributes, using a database, are described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

INFORMATION OBJECTS THAT CONTAIN COLLECTIONS

Information objects are defined according to abstract data types (ADTs). In this context, the terms "information object" or "data object" refer broadly to elements that can be manipulated by a computer program, including objects created and used by an application program prepared using an object-oriented programming language, and objects created by a database server and stored in a database.

An ADT may have one or more attributes that are data collections. Examples of data collections include "varrays" and "nested tables". The name varray refers to a data type that is a variable length array. A varray has ordered elements, each accessible using an index value that represents the ordinal position of the element. Unlike traditional arrays, a varray has no maximum number of elements. In one embodiment, an object of type varray is declared having an initial upper bound. In an alternate embodiment, varray objects can be declared with no upper bound. In either embodiment, when information is stored in the varray, internal system mechanisms allocate elements when they are needed, and de-allocate and reclaim space used by elements when they are not needed.

A nested table is a database table, maintained by a database server, that forms one attribute of an ADT of an object. The term "nested" refers to the logical position of the table within another information structure. A nested table attribute has all the attributes of any other table maintained by the database server. For example, database server queries (such as queries in the Structured Query Language (SQL) language) can be applied to a nested table, yielding a view or a set of records for further manipulation. Nested tables store data in rows and columns. The rows in a nested table are not inherently ordered.

As an example, an information object is defined by a complex abstract data type, "Employee," as shown in Table 1.

TABLE 1

ADT <EMPLOYEE>

```
struct Employee {
    char[20] Name;
    Date Hired;
    OCIArray *Supervises;
    OCITable *Dept_Name_Table;
    int Salary;
    char[16] Position;
    int Employee_Number
}
```

The ADT of Table 1 describes a hypothetical employee of a company and is therefore named Employee. Objects of type Employee have a Name attribute that stores the employee's name as a string of up to 20 characters. The Hired attribute is defined as type Date; the example presumes that the programmer has previously defined type Date to store calendar dates and that type Date is a character string type. The Supervises attribute defines other employees who are supervised by this employee.

The Supervises attribute is an example of what is referred to in this context as a varying length array or "varray"; it is an array of objects of type Employee that has no upper bound or maximum number of elements. The Department attribute is nested database table attribute that refers to a department name table called Dept_Names_Table. The Salary attribute is an integer that stores the employee's annual salary. The Position attribute is a character string that stores a description of the employee's job. The Employee_Number attribute is an integer that stores a unique employee number for identifying the employee.

The structure shown in Table 1 is merely an example of how an ADT can be declared. In other programming environments and systems, other syntax can be used to accomplish an equivalent result. Such other mechanisms for declaring ADTs are fully within the scope of the invention.

In an embodiment, a database system stores information objects that are declared according to ADTs. The database system also stores metadata that describes the ADT of each information object. For example, the database system stores Type Descriptor Segments, Type Descriptor Objects, Format Descriptor Objects, and Location Descriptor Objects that define characteristics of information objects managed by the system. The metadata are stored in database tables so that they are rapidly accessible by the database system. The structure and use of such metadata are fully described in co-pending U.S. patent application Ser. No. 08/961,795, entitled "Apparatus and Method for Pickling Data," attorney docket number 3018-092 (OID 1997-10-01), which is hereby incorporated by reference as if fully set forth herein.

STORAGE MECHANISMS FOR NESTED TABLES

FIG. 1 is a diagram of how a nested table attribute of an Employee object can be represented in computer memory. In this embodiment, objects are created and managed by a database server application program. One suitable database server is the Oracle8 database server commercially available from Oracle Corporation, Redwood Shores, Calif. Database servers have the integral capability to create and manipulate tables of information in memory.

In FIG. 1 a nested table storage mechanism comprises a base table 10, a storage table 20, and a dictionary table 30. The base table 10 has rows 14a, 14b, 144c, 14d and columns 12*a*, 12*b*, 12*c*, and 12*d*. Table 10 is shown in FIG. 1 having four rows and four columns by way of example only; each of the tables described in this document can have any desired number of rows and columns. The lines that connect rows 14*c* and 14*d*, and columns 12*c* and 12*d*, indicate that any number of rows or columns may be used in the base table 10.

In the preferred embodiment, each row 14*a*–14*d* of base table 10 stores one information object, and each column 12*a*-12*d* stores one attribute of the ADT for an information object that is stored in a particular row. Thus, for example, when an object of type Employee is stored in one row 14*a* of the table 10, data for the first attribute (Name) is stored in column 12*a* of row 14*a*, data for the second attribute (Hired date) is stored in column 12*b* of row 14*a*, and data for other attributes is stored in successive columns. The database server creates and maintains a separate base table 10 for each ADT that is defined in the system. In this way, each object that is active in the database system maps to a row of the base table 10 for a particular type, and each attribute of the type maps to a column of that table. In one alternate embodiment, each column stores an image produced by applying data of an attribute to a pickier process.

An attribute of an object can be a nested table, that is, an attribute of an object can be defined as a table that is nested within the object. In such a case, table 10 is called a base table, and it is related through one column 12*d* to a storage table 20. Column 12*d* stores nested table references 16*a*, 16*b*, 16*c*. The storage table 20 has unordered rows 36*a*, 36*b*, 36*c*, 36*d*, 36*e*, 36*f*. Groups of the rows 36*a*–36*f* correspond to a nested table reference 16*a*, 16*b*, 16*c* in column 12*d*. The storage table has an identifier column 22, and data columns 24, 26 (and others if needed) that store data. However, the value of each nested table reference 16*a*–16*c* maps uniquely to one group of rows in the storage table 20. Thus, the storage table 20 can be regarded as a group of nested tables all having the same type. For example, rows 36*a* and 36*c* each have the same setid value, and therefore belong to a first nested table. Rows 36*b*, 36*d* belong to a second nested table. Accordingly, even though the rows in the storage table 20 are unordered, using the value in the identifier column 22, the system can retrieve and assemble nested tables.

For example, as shown in FIG. 1, when an Employee object is stored in base table 10, the Department attribute is represented by column 12*d*. Column 12*d* stores an identifier 16*a* that refers to a portion 28*a* of the storage table 20 that stores Department information for the object of row 14*a*. Each row 36*a*–36*f* of the storage table 20 stores one object of the base type of the storage table 20. Each column 24, 26 stores data for one attribute of objects of the base type of the storage table 20. Thus, when a base table 10 has multiple unique nested table identifiers 16*a*, 164*c*, each such identifier maps to a different portion 28*a*, 28*b* of the storage table 20. In this way, a single storage table 20 stores more than one logical nested table that is referenced in the base table 10. In one embodiment, identifiers 16*a*, 16*b*, 16*c* are called "set identifiers" or "setid"s.

In the preferred embodiment, the column 12*d* is a hidden column having the name NESTED_TABLE_ID.

The storage table 20 and the base table 10 are interrelated using entries in a dictionary table 30. The dictionary table is a database table managed internally by the database server. Each row of the database table stores an identifier of a table that is active in the database system. Each column stores identifiers of related tables, characteristics, and other metadata relating to the active tables. Thus, for a given table that is active in the database system, there may be many rows in the dictionary table referring to that table.

In the example of FIG. 1, the dictionary table 30 has rows 31*a*, 31*b* and columns 32, 34. Column 32 stores base table identifiers. Column 34 stores nested table identifiers. If a particular base table has references to multiple nested tables, then in the dictionary table 30 there would be a row for each reference, and the nested table identifier column 34 would identify each nested table that is referred to in an object of the base table. Using a dictionary table structured in this way, a database server can locate a nested table based on a base table identifier.

Figure 2:
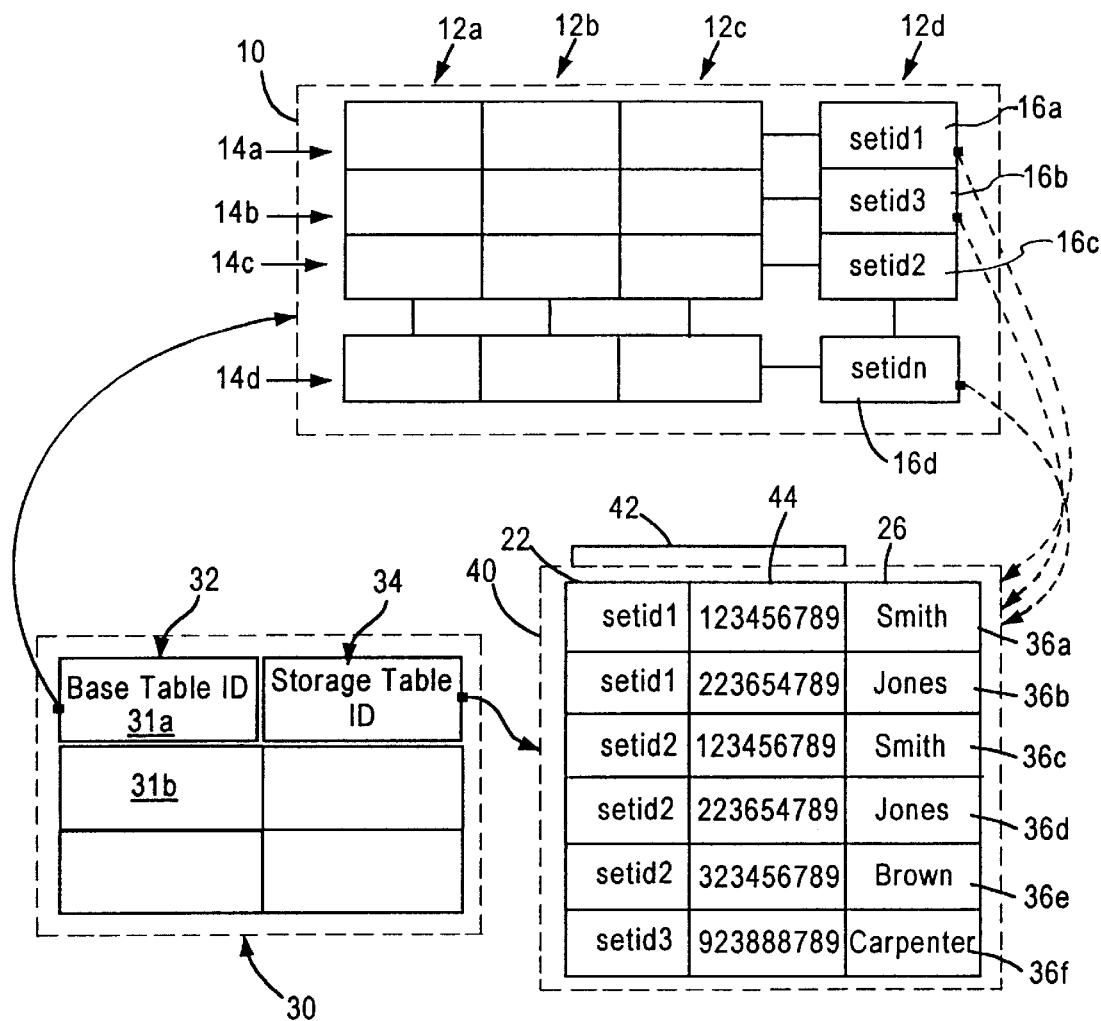
FIG. 2 is a block diagram of a second mechanism for storing nested tables.

FIG. 2 shows an alternate embodiment of the mechanism of FIG. 1. In this embodiment, the storage table 20 is stored in the form of an index-organized table ("IOT") 40. An index-organized table is an ordered database table that has the conceptual structure of a binary tree. Generally, binary trees are well known in the art; they are described, for example, in the Knuth reference cited above, at section 2.3. Index-organized tables are described in detail in co-pending U.S. patent application Ser. No. 08/764,112, now U.S. Pat. No. 5,852,822 "Index-Only Tables With Nested Group Keys", which is incorporated by reference as if fully set forth herein.

In the IOT 40, each leaf node stores a row of the nested table. In one embodiment, the leaf nodes are data structures that are initialized and allocated having the same structure as the ADT of the base type of the nested table. For example, when the IOT 40 represents the Department_Name_Table attribute of the Employee object ADT of Table 1, each leaf node is a data structure of type Department, because that is the base type of the nested table attribute. Branch nodes of the IOT 40 store a key value comprising a concatenated primary key and index value. The primary key of the IOT is specified by the user when the IOT is declared. The index value indicates the table membership of multiple rows that have the same primary key value in the IOT.

For example, as shown in FIG. 2, the primary key is the social security number of the employee represented by the Employee object of Table 1, and the branch nodes of the IOT 40 store a concatenated key value 42 comprising a setid 22 and the social security number or index value 44. For clarity, column 26 of the IOT 40 is shown as storing the surname of the employee. If multiple rows of the IOT have the same social security number value, the setid is used to indicate that the rows belong to different nested tables that are identified by the setid. In this way, multiple nested tables each having multiple rows are ordered within the IOT 40.

Rows of a particular table are located by walking the tree and examining the setid at each leaf node.

When a varray is stored in an IOT, the varray index value is used to order the rows of the IOT, rather than the primary key. This technique is used in order to preserve the ordering of the varray elements, i.e., to ensure that element 4 of a particular varray object is ordered in the IOT before element 5.

In one embodiment, a nested table can be declared without an underlying object type.

When a nested table is declared and its elements are not declared to have an object type, the database server creates the table with a single unnamed column. The internal database server keyword COLUMN_VALUE represents the name of the column, and can be used to access elements in the nested table.

STORAGE MECHANISMS AND METHODS FOR VARRAYS

In one embodiment, ADT attributes of information objects are declared to be of type varray, and the attributes are stored in a database system. Several different storage mechanisms are used according to the potential storage space needed for the varray and the size of its elements.

Figure 3:
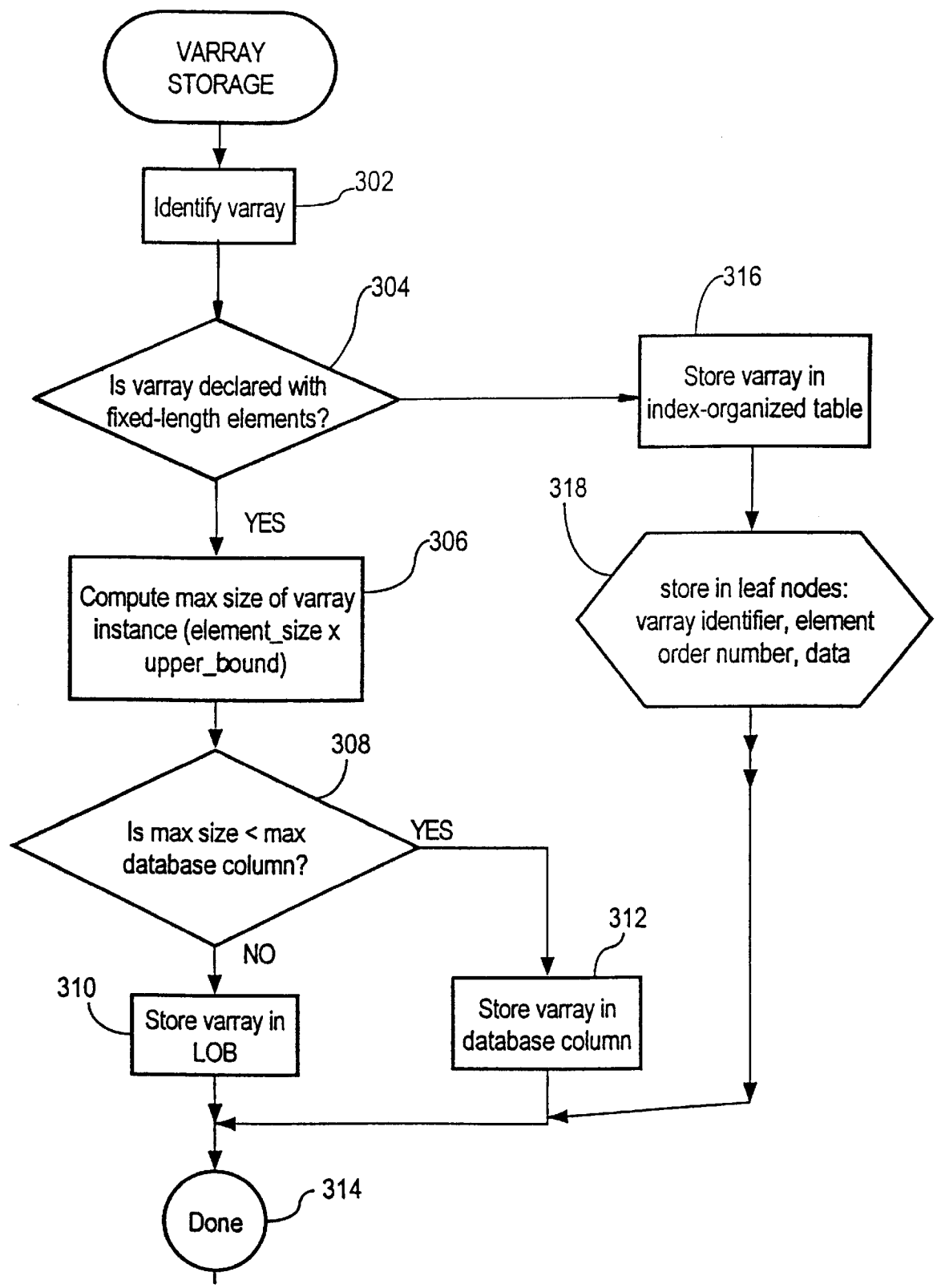
FIG. 3 is a flow diagram of a method of storing variable length arrays.

FIG. 3 is a flow diagram of a method of selecting a storage mechanism for varray attributes. In step 302, a varray attribute of an ADT is identified. For example, a varray attribute is recognized by a database server in the compilation phase of processing an application program, when an object is declared based on an ADT that has a varray attribute.

Varrays may be declared with base elements that have a fixed length or a varying length. For example, an ADT attribute is declared to be a "varray [150] of integer." Such a varray has up to 150 elements, each of which is an integer. The "integer" designation indicates that the varray has fixed length elements, because integers are always stored in a fixed amount of storage space, e.g., four bytes. In contrast, an ADT attribute also can be declared to be a "varray [150] of CharString" in which the type "CharString" is a varying length character string. In that case, the base type of the varray does not have a fixed length.

If the varray attribute is declared with base elements that have fixed length, as indicated in block 304 of FIG. 3, then the attribute is either stored in a database column or a large object ("LOB"), depending on the maximum storage space required for an instance of the attribute. The maximum storage space required for an attribute is calculated by multiplying the maximum number of elements declared in the varray declaration and the size of each element, as shown in block 306. For example, when an attribute is declared as "varray [150] of integer," and integers are stored in four bytes, the maximum storage space required is 600 bytes per instance of that attribute.

As shown in block 308, if the maximum size of an instance of a varray is less than the maximum size of a database column, then in block 312 values of the varray attribute are stored in a column of the base table 10 just like any other attribute. In the preferred embodiment, the maximum size of a value of a database column is 4096 bytes. Therefore, in the preferred embodiment, when a varray declaration indicates that the maximum size of an instance of the varray attribute is 4096 bytes or less, then values of the varray attribute are stored in a database column.

If the storage space needed for an instance of a varray attribute is potentially larger than 4096 bytes, then as shown in block 310 the varray is stored in a database object of type Large Object ("LOB"). LOB is the name used for a data type that represents very large data objects. LOBs may be much larger than traditional data types. For example, a single LOB may include four gigabytes of data. LOBs are managed and supported by existing mechanisms in a database server. For example, LOBs are managed by the Oracle8 database server. The use, management, and operation of LOBs are described in more detail in "Oracle8 Server On-Line Generic Documentation CD-ROM," available from Oracle Corporation, Redwood Shores, Calif. (part number A55125-01), and two co-pending U.S. Patent Applications, each of which is hereby incorporated by reference as if fully set forth herein: U.S. patent application Ser. No. 08/962,487, now allowed "LOB Locator," Attorney Docket Number 3018-097 (OID-1997-10-06), and U.S. patent application Ser. No. 08/962, 132, now allowed "LOB Indexing," Attorney Docket Number 3018-107 (OID-1997-10-14).

If a varray attribute is declared to have varying length elements, then the test of block 304 will be negative. In that case, as shown in block 316, instances of that varray attribute are always stored in an IOT. As shown in block 318, each leaf node of a varray IOT stores a data triple comprising a varray identifier, a non-unique element order number, and a data value for that element. In one embodiment, the unique varray identifier is a set identifier called a setid. Thus, each leaf node contains information identifying which varray is represented in the leaf node, which element of that varray is represented in the leaf node, and the value of the element.

When the varray attribute has been fully evaluated and one of the three storage mechanisms (database column, LOB, or IOT) has been selected, the method is complete as shown by block 314.

RETRIEVING COLLECTIONS

Figure 4:
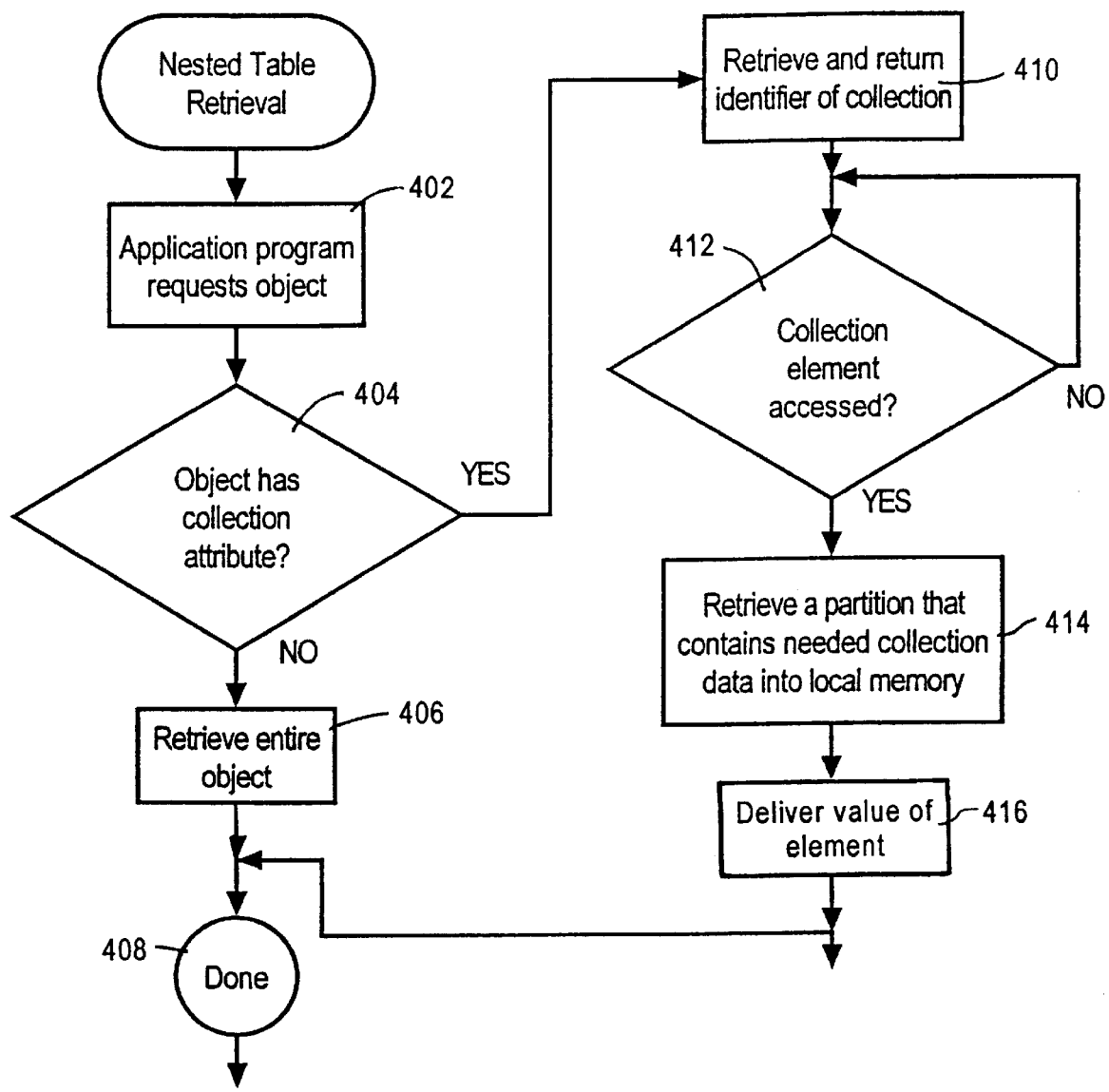
FIG. 4 is a flow diagram of a method of retrieving nested tables.

FIG. 4 is a flow diagram of a method of retrieving an object that contains a collection attribute from a storage location. In an embodiment, FIG. 4 represents processing steps carried out when an object having a collection attribute is retrieved from non-volatile storage, such as disk, to volatile storage, such as an object cache of a database server that needs the object, or local memory of a machine or process that needs the object.

In block 402, an application program requests an information object. Block 402 is intended to broadly reflect any process of requesting an information object that is under management by a database server or other process or program that implements the invention. For example, block 402 represents a request by a database server to obtain an information object that is needed to carry out an application program running under control of the server.

In block 404, the object's ADT is examined to determine whether the object has a collection attribute. In an embodiment, this step is carried out by retrieving metadata that describes the type of the object from a table of the database system. For example, each information object includes a type identifier that is stored in association with data values and methods of the object. Using the type identifier, the database system looks up metadata about that type of object in an object type table. The database system retrieves a type descriptor object corresponding to the object's type from that table, and interprets the information in the type descriptor object. The type descriptor object has fields that indicate the data type of each attribute of an object. Collections including nested tables and varrays are indicated by unique codes in the attribute fields of the type descriptor object.

If the metadata indicates that the object does not have any collection attributes, then as shown in block 406, the entire object is retrieved from its location in non-volatile storage and copied into volatile storage, such as the object cache. At this point, the object is ready for further use by an application program, and the method is considered complete, as shown in block 408.

If the object contains a collection attribute, it is desirable not to retrieve the values or other contents of the collection attribute until they are actually needed by the database server or a related application program. Collection attributes, such as nested tables, may be quite large. Accordingly, if the entire collection attribute is always retrieved when an object is requested, it is possible that the available volatile storage space associated with the requesting program or process will be insufficient. The address space may overflow.

Therefore, as shown in block 410, when a requested object has a collection attribute, only an identifier of the collection attribute is retrieved and returned to the requesting program or process. The identifier is a handle or reference to the values of the collection. For example, in an embodiment, the identifier is a value comprising a base table identifier concatenated with a "setid", and when the requested object is delivered to the calling program, the object contains the identifier in the position of the collection attribute.

Block 412 represents processing steps in which the contents of the collection attribute remain untouched until they are needed by a calling program or process. Thus, the collection attribute remains in non-volatile storage until an element of the collection is actually requested or needed by the database server or a related program. In that event, as shown in block 414, in one embodiment, a partition of the non-volatile storage device that contains the needed element value is retrieved into local volatile storage, or into the object cache. Preferably, the partition is pinned or locked so that other programs or processes cannot modify the partition while the collection element value is in use. In block 416, the value of the element is delivered to the database server or the calling program.

IMPLEMENTATION OF MECHANISMS AND METHODS

In the preferred embodiment, the mechanisms and methods of the invention are implemented in the form of one or more computer program functions, procedures, processes, objects, or methods that can be incorporated into an application program that needs to manipulate nested tables. In one embodiment, collections are supported in a plurality of database server functions. Each of the functions has a name and receives a set of parameters. The set of all function names and their parameters defines an Application Programming Interface (API) to the functions. An example of this embodiment is the API called the Oracle Call Interface (OCI) provided in the Oracle8 database server, commercially available from Oracle Corporation.

Preferably, the functions are classified as nested table functions, variable length array (varray) functions, generic collection functions that work with either nested tables or varrays, and iteration functions that are used to work with individual elements of a collection. In one embodiment, the functions in these four groups have names beginning with the labels OCITable, OCIArray, OCIColl, and OCIIter, respectively. In this embodiment, an application program written in the C language declares an object of type varray using the syntax OCIArray *, and nested table objects are represented as OCITable *. All the function names and object names presented in this document are provided merely as examples; any other names may be used within the spirit and scope of the invention.

GENERIC COLLECTION FUNCTIONS

In an embodiment, generic collection functions are provided that enable an application program to manipulate collection data. These functions are called "generic" because an application program can apply the functions to any collection type including varrays and nested tables. Other functions, discussed below, are specific to nested tables. Thus, varrays and nested tables can be viewed as sub-types of a generic collection type.

In one embodiment, in application programs written in the C language, a generic collection is represented as OCIColl *. In the preferred embodiment, the generic collection functions operate on generic collection objects (such as OCIColl *) as well as varrays and nested tables. Additional functions that operate specifically on nested tables are identified by the prefix OCITable. The nested table functions are described in the section below entitled "Nested Table Manipulation Functions."

An application program can allocate an instance of a varray or nested table using the function OCIObjectNew( ) and free an instance using OCIObjectFree. The generic collection functions carry out two other main types of processes: manipulating varray or nested table data, and scanning through a collection with a collection iterator. When an index variable or value is passed to a collection function, the minimum value of the index variable is preferably zero.

COLLECTION DATA MANIPULATION FUNCTIONS

The preferred embodiment has functions that manipulate collection data. The names and functions of the generic functions are summarized in Table 2 below.

TABLE 2

COLLECTION DATA MANIPULATION FUNCTIONS

| Function | Purpose |
| --- | --- |
| OCICollAppend() | append an element |
| OCICollAssignElem() | assign element at given index |
| OCICollAssign() | assign one collection to another |
| OCICollGetElem() | get pointer to an element given its index |
| OCICollMax() | get upper bound of collection |
| OCICollSize() | get current size of collection |
| OCICollTrim() | trim n elements from the end of the collection |

Each of the functions named in Table 2 is called by including an appropriate function call statement in an application program that is linked to the function, a library of the functions, or to the database server. Each function call passes, as a parameter to the function call, a handle or pointer to a collection that is to be manipulated. Additional parameters are passed to the functions depending on the nature of the work carried out by the function.

The function OCICollAppend( ) is called with an element value, or a handle or pointer to an element value, as a parameter. The function allocates storage space for an additional element, and stores the element value in the newly allocated space.

The function OCICollAssignElem( ) is called with an element value, and an index value. The index value indicates an ordinal position within the collection. The function locates the requested position and assigns the element value to the element at that position.

The function OCICollAssign( ) is called with a source collection identifier and a destination collection identifier. The function locates a collection indicated by the source collection identifier, and copies the information in that collection into the collection that is identified by the destination collection identifier.

The function OCICollGetElem( ) is called with a collection index value as a parameter. The collection index value represents the ordinal position of an element of the collection. The function locates the element that is indicated by the collection index value, and returns a pointer to that element.

The function OCICollMax( ) is called with no parameters other than a collection identifier. The function returns an integer value representing the number of items or upper bound of the collection. For example, when a varray object is declared as "varray [150] of char," the function would return the value "150" regardless of whether 150 values are actually stored in the object.

The function OCICollSize( ) also is called with no parameters other than a collection identifier. The function returns an integer representing the number of values in the collection, that is, the current size of collection. For example, when a varray object is declared as "varray [150] of integer," and 16 values have been stored in the object, this function would return the value 16 for that object.

The function OCICollTrim( ) is called with an integer value as a parameter. The value represents a number of elements to be removed or "trimmed" from the end of a collection object. The function returns a Boolean value indicating whether the trim operation was successful.

COLLECTION SCANNING FUNCTIONS

The preferred embodiment also has generic functions that enable an application program to scan collections using a collection iterator. The collection iterator is a value declared of type OCIIter. The collection scanning functions are summarized in Table 3 below.

TABLE 3

COLLECTION SCANNING FUNCTIONS

| Function | Purpose |
| --- | --- |
| OCIIterCreate() | create an iterator for scanning collection |
| OCIIterDelete() | delete iterator |
| OCIIterGetCurrent() | get pointer to current element pointed by iterator |
| OCIIterInit() | initialize iterator to scan the given collection |
| OCIIterNext() | get pointer to next element |
| OCIIterPrev() | get pointer to previous element |

The function OCIIterCreate( ) is called to create an iterator object for a specified collection. It returns a handle to the iterator object that it creates. The iterator is initialized to point to the beginning of the collection.

The function OCIIterDelete( ) is called using a handle or pointer to an iterator as a parameter. The function deletes the iterator that is identified by the parameter.

The function OCIIterGetCurrent( ) is called using an iterator and a collection as parameters. The function locates the element at the position indicated by the iterator, and generates a pointer to that element. The function returns the element pointer to the calling program.

The function OCIIterInit( ) is called using an iterator and a collection as parameters. The function initializes the iterator to point to the beginning of the collection. The iterator can then be used in subsequent function calls.

The function OCIIterNext( ) is called using an iterator as a parameter. The function locates an element at the next position greater than the iterator, and returns a pointer to that element. It also increments the iterator. If there is no next element, the function returns an error code or raises an exception. The OCIIterPrev( ) operates similarly to the function OCIIterNext( ), but the function OCIIterPrev( ) returns a pointer to the previous element in relation to the iterator that is passed as a parameter.

Collection iterators and the above-defined functions can be used to scan through a varray and perform numerous useful functions. An example of such an operation, in which collection iterators are used to generate a printout of the contents of a collection object, is provided in the code segment provided in Table 4 below.

TABLE 4

CODE EXAMPLE: SCANNING A VARRAY

```
OCIEnv      *envhp;
OCIError    *errhp;
text        *text_ptr;
sword       status;
OCIArray    *clients;
OCIString   *client_elem;
OCIIter     *iterator;
boolean     eoc;
dvoid       *elem;
OCIInd      *elemind;
/* Assume envhp, errhp have been initialized */
/* Assume clients points to a varray */
/* Print the elements of clients */
/* To do this, create an iterator to scan the varray */
status = OCIIterCreate(envhp, errhp, clients, &iterator);
/* Get the first element of the clients varray */
printf("Clients' list:\n");
status = OCIIterNext(envhp, errhp, iterator, &elem,
                    (dvoid **) &elemind, &eoc)
while (!eoc && (status == OCI_SUCCESS))
{
        client_elem = *(OCIString**) elem;
        /* client_elem points to the string */
/*
        the element pointer type returned by OCIIterNext() via 'elem' is
        the same as that of OCICollGetElem(). Refer to OCICollGetElem()
        for details. */
/*
        client_elem points to an OCIString descriptor, so to print it out,
        get a pointer to where the text begins
*/
text_ptr = OCIStringPtr(envhp, client_elem);
    /*
        text_ptr now points to the text part of the client OCIString,
        which is a NULL-terminated string
    */
printf(" %s\n", text_ptr);
status = OCIIterNext(envhp, errhp, iterator, &elem;
        (dvoid **)&elemind, &eoc);
}
if (status != OCI_SUCCESS)
{
/* handle error*/
}
/* destroy the iterator */
status = OCIIterDelete(envhp, errhp, &iterator);
```

NESTED TABLE MANIPULATION FUNCTIONS

As noted above, the generic collection functions may be used to map to and manipulate nested tables. In addition, the preferred embodiment has functions for manipulating nested tables. These nested table manipulation functions are summarized in Table 5 below.

TABLE 5

NESTED TABLE MANIPULATION FUNCTIONS

| Function | Purpose |
| --- | --- |
| OCITableDelete() | delete an element at a given index |
| OCITableExists() | test whether an element exists at a given index |
| OCITableFirst() | return index for first existing element of table |
| OCITableLast() | return index for last existing element of table |
| OCITableNext() | return index for next existing element of table |
| OCITablePrev() | return index for previous existing element of table |
| OCITableSize() | return table size, not including deleted elements |

The function OCITableDelete( ) is called to delete elements from a nested table. An index value is passed to the function as a parameter, and the function deletes the elements at that index location. For example, a table is created with 10 elements, and OCITableDelete( ) is used to delete elements at index 0 through 4 and 9. Then, the first existing element is element 5, and the last existing element is element 8.

The function OCITableExists( ) is called with a collection handle and an index value as parameters. The function tests whether an element exists in the collection at the index that is passed as a parameter. It returns a Boolean value that is TRUE when the element exists in the collection.

The function OCITableFirst( ) is called using a handle or pointer to a table as a parameter. The function locates the indicated table, identifies the first existing element in the table, and returns an integer value representing the ordinal value or index for the first existing element of the table.

The functions OCITableLast( ), OCITableNext( ), and OCITablePrev( ) receive the same parameter and carry out steps similar to the function OCITableFirst( ), but return index values for the last, next, and previous elements in the table, respectively.

The function OCITableSize( ) receives a handle or pointer to a table as a parameter. The function returns an integer value that represents the size, in elements, of the table. In computing the size value, the function ignores deleted elements.

NESTED TABLE ELEMENT ORDERING

When a nested table is fetched into the object cache, its elements are given a temporary or transient ordering, numbered from zero to the number of elements, minus 1. For example, a table with 40 elements would be numbered from 0 to 39. An application program can use these position ordinals to fetch and assign the values of elements (for example, fetch to element i, or assign to element j, where i and j are valid position ordinals for the given table).

When the table is copied back to the database, its transient ordering is lost. Delete operations may be performed against elements of the table. Delete operations create transient "holes"; that is, they do not change the position ordinals of the remaining table elements.

APPLICATIONS OF VARRAYS AND NESTED TABLES

Varrays and nested tables are best suited to different applications. For example, an application program needs to manage a list of telephone numbers. The list of phone numbers can be stored in either a varray or a nested table. Suppose the list represents contact phone numbers for a single customer in a product ordering application. A varray is a better choice than a nested table for several reasons.

First, the order of the numbers might be important. Varrays are ordered. Nested tables are unordered. Second, the number of phone numbers for a specific customer is small. To use a varray, the application program must specify a maximum number of elements (ten, in this case) in advance. They use storage more efficiently than nested tables, which have no special size limitations. Also, there is no reason to query the phone number list, so the table format offers no benefit.

In general, if ordering and bounds are not important design considerations, then the following rule can be used to decide whether to use a varray or a nested table in a particular application: If the application program needs to query the information collection, a nested table should be used. If the application program needs to retrieve the collection as a whole, a varray is preferable.

As a second example, assume that an application program declares a class of objects called type line__item__list__t. A data unit of that type is a nested table, each row of which contains a line__item__t object. The nested table of line items represents a purchase order. A nested table of line items is better choice to represent the line item list of a purchase order than a varray of line__item__t objects would be, for the following reasons. First, querying the contents of line items is likely to be a requirement for most applications that use purchase orders. Varrays can be directly queried by the database server, but such queries are not efficient. When a varray is stored in a LOB or database table column, it is stored as a pickled image. To carry out a query, the database server must use accessor functions to locate elements of the varray within the image. In contrast, when a varray is stored in an IOT as described herein, it is not stored in pickled image form and can be directly queried.

Second, indexing on line item data may be a requirement in some applications. Nested tables allow this, but it is not possible with varrays. Third, the order of line items is usually unimportant, and the line item number can be used to specify an order when necessary. Also, there is no practical upper bound on the number of line items on a purchase order.

HARDWARE ENVIRONMENT

Figure 5:
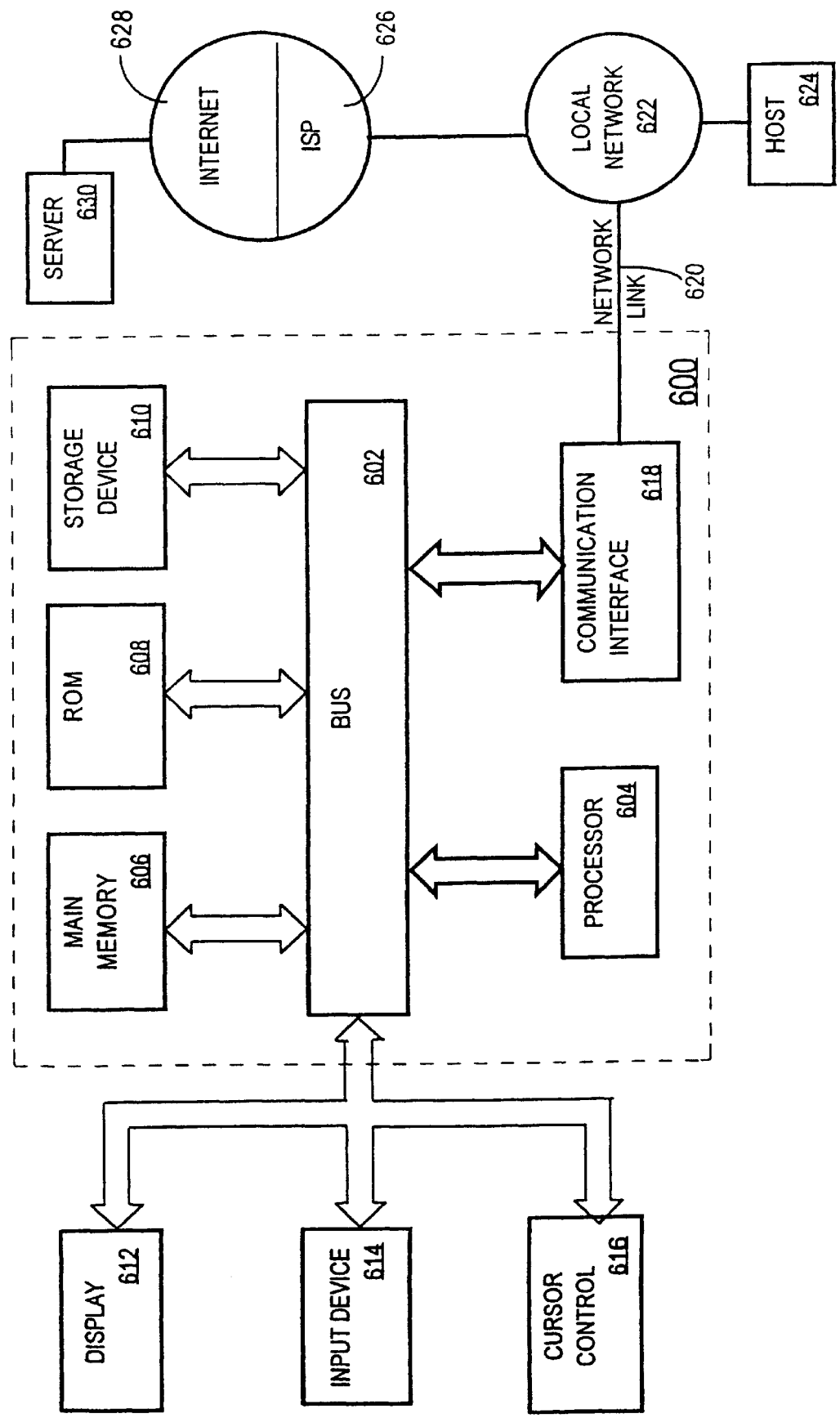
FIG. 5 is a diagram of a computer system with which the invention can be implemented.

FIG. 5 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for storing and using pickled images of information objects in database tables, storing object collections, and storing and using null objects. According to one embodiment of the invention, such object storage and use is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more of one or more instructions to processor 604 for execution. For example, the sequence instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for storing and using pickled images of information objects in database tables, storing object collections, and storing and using null objects, as described herein.

The received code may be executed by processor 604 as it is received, and/or stored in storage device 610, or other non-volatile storage for later execution. In this manner, computer system 600 may obtain application code in the form of a carrier wave.

EXTENSIONS AND APPLICATIONS

The methods and mechanisms described herein provide efficient ways to accomplish data storage in a database system. For example, objects stored in the form of images in a database table can serve as a backing store for objects in memory, replacing storage of graphs in memory, or caches.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of storing an information object in a database system, comprising the steps of:

establishing an information object class that has a collection attribute;

creating said information object as an instance of said information object class;

establishing in said database system a collection storage structure for said collection attribute;

storing attribute information about said information object in a first table;

storing values of said collection attribute in said collection storage structure; and wherein said attribute information that is stored in said first table includes a reference that indicates where said values of said collection attribute for said information object are stored in said collection storage structure.

2. The method recited in claim 1, further comprising the steps of:

establishing a second table in said database system;

storing a first identifier that identifies said first table and a second identifier that identifies said collection storage structure; and storing within said second table a record that associates said first identifier with said second identifier.

3. The method of claim 2, wherein said information object class has another collection attribute, and wherein the method further comprises the step of storing within said second table a second record, wherein said second record associates said first identifier with a third identifier that identifies another collection storage structure, wherein said other collection storage structure is used to store values that belong to said other collection attribute.

4. The method recited in claim 1, further comprising the steps of:

establishing said collection storage structure in the form of a storage table in said database system;

establishing in said storage table, at least one nested table portion comprising rows of values of said collection attribute associated with said reference; and storing a copy of said reference in a column of said storage table.

5. The method recited in claim 1, wherein said step of establishing an information object class that has a collection attribute comprises the step of establishing a variable length array as said collection attribute of said information object class.

6. The method recited in claim 5, further comprising the steps of:

when said variable length array is defined having fixed-length elements:

computing a maximum size value representing an amount of storage space required for an instance of said variable length array; and storing said variable length array in a database column when said maximum size value is equal to or less than a pre-defined maximum database column size value.

7. The method recited in claim 6, further comprising the step of storing said variable length array in a large object structure when said maximum size value is greater than said maximum database column size value.

8. The method recited in claim 5, further comprising the step of:

when said variable length array is defined having variable-length elements, storing said variable length array in an index-organized table.

9. The method recited in claim 8, further comprising the step of storing, in a node of said index-organized table, an identifier of said variable length array, an element order value indicating an ordinal position within said variable length array of an element of said variable length array, and a value of said element.

10. The method recited in claim 1, further comprising the steps of:

establishing said collection storage structure as an index organized table; and storing, in a leaf node of said index organized table, a value of said collection attribute.

11. The method recited in claim 1, further comprising the steps of:

retrieving said information object by carrying out the steps of:

when said information object has at least one collection attribute:

retrieving said reference to said collection storage structure; and retrieving a value of an element of said collection attribute and delivering said value to an external process only when said element is accessed by said external process.

12. The method recited in claim 11, further comprising the steps of:

retrieving said information object and all values of each attribute thereof when said information object has no collection attribute.

13. A computer apparatus for storing an information object in a table of a database system, said computer apparatus comprising:

a processor; and a memory coupled to said processor; the memory having stored therein a database system; and sequences of instructions which, when executed by said processor, cause said processor to store said information object in said database system by causing the processor to perform the steps of:

establishing an information object class that has a collection attribute;

creating said information object as an instance of said information object class;

establishing in said database system a collection storage structure for said collection attribute;

storing attribute information about said information object in a first table;

storing values of said collection attribute in said collection storage structure; and wherein said attribute information that is stored in said first table includes a reference that indicates where said values of said collection attribute for said information object are stored in said collection storage structure.

14. A computer-readable medium carrying one or more sequences of instructions which, when executed by one or more processors, cause said one or more processors to store an information object in a database system accessible to said one or more processors by causing said one or more processors to perform the steps of:

establishing an information object class that has a collection attribute;

creating said information object as an instance of said information object class;

establishing in said database system a collection storage structure for said collection attribute;

creating an information object as an instance of said information object class;

storing attribute information about said information object in a first table;

storing values of said collection attribute in said collection storage structure; and wherein said attribute information that is stored in said first table includes a reference that indicates where said values of said collection attribute for said information object are stored in said collection storage structure.

15. The computer-readable medium recited in claim 14, further comprising sequences of instructions for performing the steps of:

establishing a second table in said database system;

storing a first identifier that identifies said first table and a second identifier that identifies said collection storage structure; and storing within said second table a record that associates said first identifier with said second identifier.

16. The computer-readable medium of claim 15, wherein said information object class has another collection attribute, and wherein the computer-readable medium further comprises sequences of instructions for performing the step of storing within said second table a second record,
wherein said second record associates said first identifier with a third identifier that identifies another collection storage structure, wherein said other collection storage structure is used to store values that belong to said other collection attribute.

17. The computer-readable medium recited in claim 14, further comprising sequences of instructions for performing the steps of:

establishing said collection storage structure in the form of a storage table in said database system;

establishing in said storage table, at least one nested table portion comprising rows of values of said collection attribute associated with said reference; and storing a copy of said reference in a column of said storage table.

18. The computer-readable medium recited in claim 14, wherein said step of establishing an information object class that has a collection attribute comprises the step of establishing a variable length array as said collection attribute of said information object class.

19. The computer-readable medium recited in claim 18, further comprising sequences of instructions for performing the steps of:

when said variable length array is defined having fixed-length elements:
computing a maximum size value representing an amount of storage space required for an instance of said variable length array; and
storing said variable length array in a database column when said maximum size value is equal to or less than a pre-defined maximum database column size value.

20. The computer-readable medium recited in claim 19, further comprising sequences of instructions for performing the step of storing said variable length array in a large object structure when said maximum size value is greater than said maximum database column size value.

21. The computer-readable medium recited in claim 18, further comprising sequences of instructions for performing the step of:

when said variable length array is defined having variable-length elements, storing said variable length array in an index-organized table.

22. The computer-readable medium recited in claim 21, further comprising sequences of instructions for performing the step of storing, in a node of said index-organized table, an identifier of said variable length array, an element order value indicating an ordinal position within said variable length array of an element of said variable length array, and a value of said element.

23. The computer-readable medium recited in claim 14, further comprising sequences of instructions for performing the steps of:

establishing said collection storage structure as an index organized table; and storing, in a leaf node of said index organized table, a value of said collection attribute.

24. The computer-readable medium recited in claim 14, further comprising sequences of instructions for performing the steps of:

retrieving said information object by carrying out the steps of:
when said information object has at least one collection attribute:
retrieving said reference to said collection storage structure; and
retrieving a value of an element of said collection attribute and delivering said value to an external process only when said element is accessed by said external process.

25. The computer-readable medium recited in claim 24, further comprising sequences of instructions for performing the steps of:

retrieving said information object and all values of each attribute thereof when said information object has no collection attribute.

* * * * *